(12) United States Patent
Okada et al.

(10) Patent No.: US 6,484,028 B2
(45) Date of Patent: *Nov. 19, 2002

(54) INFORMATION DELIVERY SYSTEM USING SATELLITE COMMUNICATION

(75) Inventors: Akihiro Okada, Kawasaki (JP); Toru Kino, Kawasaki (JP); Susumu Eda, Kawasaki (JP); Shuichi Naito, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,161

(22) Filed: Dec. 3, 1997

(65) Prior Publication Data

US 2001/0034230 A1 Oct. 25, 2001

(30) Foreign Application Priority Data

Apr. 2, 1997 (JP) .............................................. 9-084146
Oct. 20, 1997 (JP) .............................................. 9-287344

(51) Int. Cl.[7] ........................... H04Q 7/20; H04L 12/56
(52) U.S. Cl. ...................... 455/428; 455/445; 455/12.1; 370/395.31
(58) Field of Search ................................ 455/427, 429, 455/12.1, 13.1, 54.1, 428, 517, 445, 430, 67.3, 11.1, 7, 8; 370/465, 466, 401, 409, 85.7, 310, 328, 338, 349, 395.3, 395.43, 398

(56) References Cited

U.S. PATENT DOCUMENTS

| | | | | | |
|---|---|---|---|---|---|
| 4,793,813 A | * | 12/1988 | Bitzer et al. | ................. | 434/335 |
| 5,918,156 A | * | 6/1989 | Tanabe | ....................... | 455/12.1 |
| 5,159,592 A | * | 10/1992 | Perkins | ....................... | 370/85.7 |
| 5,303,393 A | * | 4/1994 | Noreen et al. | ............... | 455/517 |
| 5,594,490 A | * | 5/1994 | Dawson et al. | ................. | 348/6 |

(List continued on next page.)

FOREIGN PATENT DOCUMENTS

WO    WO 95/34153    12/1995

*Primary Examiner*—Vivian Chin
*Assistant Examiner*—Duc Nguyen
(74) *Attorney, Agent, or Firm*—Staas & Halsey LLP

(57) ABSTRACT

An information delivery system includes terminals receiving data via a satellite-communication system, and a user center having a destination-conversion table which lists a satellite-system receiver ID with respect to each ground-network address of the terminals, and, upon receiving a request for data delivery via an intra-network, obtaining satellite-system receiver IDs from ground-network addresses indicated as destinations of the data delivery by referring to the destination-conversion table so as to deliver requested data and a reception-control program to the destinations via the satellite-communication system. The terminals use the reception-control program to check the data-reception conditions when receiving the requested data and the reception-control program, and send a request for a repeat of the data delivery to the user center via the intra-network if the data-reception conditions are not satisfactory.

4 Claims, 9 Drawing Sheets

U.S. PATENT DOCUMENTS

| | | | | |
|---|---|---|---|---|
| 5,724,345 A | * | 12/1995 | Guarneri et al. | 370/316 |
| 5,838,668 A | * | 3/1996 | Okada et al. | 370/312 |
| 5,864,358 A | * | 6/1996 | Suzuki et al. | 348/10 |
| 5,757,922 A | * | 12/1996 | Shiroshita | 380/42 |
| 5,852,721 A | * | 2/1997 | Dillon et al. | 395/200.47 |
| 5,634,198 A | * | 5/1997 | Cameron et al. | 455/67.3 |
| 5,673,256 A | * | 9/1997 | Maine | 455/54.1 |
| 5,694,580 A | * | 12/1997 | Narita et al. | 370/466 |
| 5,734,981 A | * | 3/1998 | Kennedy, III et al. | 455/445 |
| 5,805,078 A | * | 9/1998 | Sugiyama et al. | 455/445 |
| 5,857,193 A | * | 1/1999 | Sutcliffe et al. | 455/427 |
| 5,890,062 A | * | 3/1999 | Courtney et al. | 455/445 |
| 5,920,803 A | * | 7/1999 | Tayloe | 455/429 |
| 5,930,708 A | * | 7/1999 | Stewart et al. | 455/430 |
| 5,978,682 A | * | 11/1999 | Van Der Werff et al. | 455/445 |
| 6,021,307 A | * | 2/2000 | Chan | 455/3.1 |
| 6,067,442 A | * | 3/2000 | Wiedeman et al. | 455/13.1 |
| 6,074,215 A | * | 6/2000 | Tsurumi | 434/307 A |
| 6,101,180 A | * | 8/2000 | Donahue et al. | 370/352 |

* cited by examiner

FIG. 5

```
┌─────────────────────────────────────────────────────────────┐
│  SATELLITE DELIVERY SERVICE                       _ □ ×    │
├─────────────────────────────────────────────────────────────┤
│ FILE (F)  EDIT (E) DISPLAY (V) JUMP (G) BOOKMARK (B) OPTION (O) DIRECTORY (D)
│ WINDOW (W) HELP (H)                                         │
```

| LATEST INFORMATION | RECOMMENDATION | HANDBOOK | SEARCH NETWORK |

INFORMATION DELIVERY SERVICE

| TRANSMISSION FILENAME | : | [                    ] | BROWSE |
| DESTINATION DIRECTORY | : | [                    ] | BROWSE |
| TRANSMISSION STYLE | : | ● RETRANSMIT   ○ CONFIRM   ○ BEST EFFORT |
| PRIORITY | : | ○ HIGH  ● MIDDLE  ○ LOW |

DELIVERY TIME : [            ]    [            ]

DESTINATION LIST : [ GROUP 1 ▽ ]

[ DELIVERY ]    [ OPTION ]    [ DB REGISTRATION ]

FIG. 6A

| DESTINATION | SATELLITE-SYSTEM RECEIVER ID |
|---|---|
| A CO. LTD. SENDAI BRANCH | F S 0 0 1 |

NAME OF TRANSMITTED FILE
DESTINATION DIRECTORY
SATELLITE-SYSTEM RECEIVER ID

RECEPTION-CONTROL PROGRAM NAME
(CHECK PROGRAM NAME)

DELIVERY STARTING TIME
DELIVERY ENDING TIME
RESULT-REPORT E-MAIL ADDRESS
ALL-DESTINATION-RESULT-REPORT FLAG
DELIVERY-RESULT FLAG

PRIORITY(HIGH, INTERMEDIATE, LOW)
REPEAT-PROCESS FLAG

FIG. 6C

- RECEPTION-CONTROL PROGRAM
  (CHECK PROGRAM)
- DATA

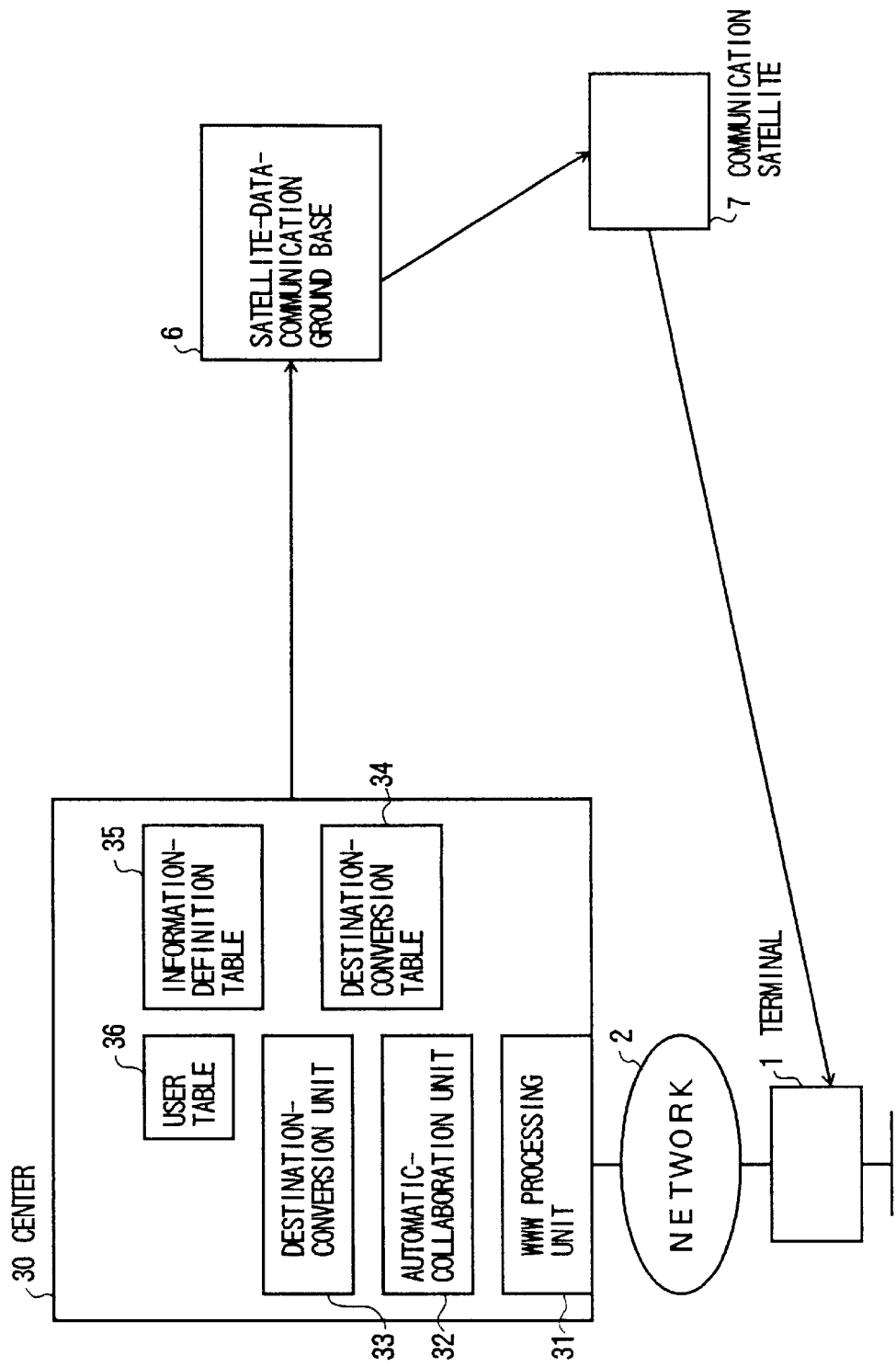

| No. | FILE NAME | RECEIVED-FILE-STORAGE DIRECTORY | SIZE | DELIVERY TIME |
|---|---|---|---|---|
| 0001 | /usr/inf01.mpg | C : ¥sate | 200MB | 03 : 00 |
| 0002 | /usr/inf02.ppt | C : ¥sate | 1MB | |
| 0100 | /usr/data01.html | C : ¥sate | 1MB | |

| | |
|---|---|
| THRESHOLD-FOR-SATELLITE-TRANSMISSION SIZE | 1MB |
| FILE-FOR-SATELLITE-TRANSMISSION TYPE | mpg.ppt |
| RECEVIED-FILE-STORAGE DIRECTORY | C : ¥sate |

| GROUND-NETWORK ADDRESS | SATELLITE-SYSTEM RECEIVER ADDRESS |
|---|---|
| 133.161.117.143 | FJSS0001 |
| 133.161.117.144 | FJSS0002 |
| 133.161.117.145 | FJSS0003 |
| ⋮ | ⋮ |
| 133.161.11*.*** | FJSS0*** |

FIG. 9C

NAME OF TRANSMITTED FILE
DESTINATION DIRECTORY
SATELLITE-SYSTEM RECEIVER ID

RECEPTION-CONTROL PROGRAM NAME
(CHECK PROGRAM NAME)

DELIVERY STARTING TIME
DELIVERY ENDING TIME
RESULT-REPORT E-MAIL ADDRESS
ALL-DESTINATION-RESULT-REPORT FLAG
DELIVERY-RESULT FLAG

PRIORITY (HIGH, INTERMEDIATE, LOW)
REPEAT-PROCESS FLAG

FIG. 9D

DATA

| USER NAME | USER ID | PASSWORD | SATELLITE-SYSTEM ADDRESS | IP ADDRESS | STORAGE DIRECTORY | DESTINATION FOR SENDING NOTICE | DELIVERY TIME |
|---|---|---|---|---|---|---|---|
| yamada | yamada | yd001 | FJSS0001 | | C:¥temp | yama | 9:00 |

INFORMATION DELIVERY SYSTEM USING SATELLITE COMMUNICATION

BACKGROUND OF THE INVENTION

1. Field of the Invention

The present invention generally relates to information delivery systems, and particularly relates to an information delivery system which delivers information from an information center to respective terminals.

2. Description of the Related Art

Conventional satellite communication systems are used for transmitting broadcasting signals towards a large number of anonymous users as used in a broadcasting satellite system, and every receiver (user) receives the same information, which is in turn displayed on a screen.

Another usage of satellite communication systems is to transfer a large amount of data to a specified base center.

In such conventional satellite communication systems, information is either transmitted to a large number of anonymous receivers or transferred to a specified base. Such usage of the conventional satellite communication systems covers a weak point of ground networks such as Internet and Intranet. When a large amount of data is attempted to be downloaded through a network such as Internet or Intranet, such an attempt will turn out to be impractical because of a prohibitingly lengthy time required for the downloading, and will create a large amount of traffic, which may seriously affect main business communications with regard to accounting, sales, telephoning, etc. In consideration of this, integration of a satellite communication system with a ground network system should prove to be beneficial.

FIG. 1 is an illustrative drawing showing an information delivery system which integrates a satellite communication system with the Internet and a public telephone network.

The information delivery system of FIG. 1 includes a terminal 101, a public telephone network 102, a user center 103, Internet 104, a terminal 105, a satellite-data-communication ground base 106, and a communication satellite 107.

An example to be described here is a case in which the same information needs to be delivered from the terminal 105 to a plurality of terminals inclusive of the terminal 101 which are scattered around in a large area. In a case of a business corporation, the plurality of terminals including the terminal 101 may be computers installed in its branches and local offices, and a corporate information center updates data of databases all at once with respect to these branches and local offices. Such a case is hereinafter referred to as a push-type service.

In the case of the push-type service, the terminal 105 requests broadcasting from the satellite-data-communication ground base 106 by transmitting a destination file and a real file to the satellite-data-communication ground base 106 via Internet 104 and the user center 103. The real file includes the contents of information which is to be delivered to the terminal 101, and the destination file indicates a destination to which the real file is to be delivered.

The satellite-data-communication ground base 106 delivers the real file to the indicated terminal 101 via the communication satellite 107 in accordance with conditions set forth in the destination file. When errors are found in the received data, the terminal 101 issues a request for a repeat of data transmission to the satellite-data-communication ground base 106 via the public telephone network 102. Upon receiving the request, the satellite-data-communication ground base 106 sends the same data again to the terminal 101 via the communication satellite 107. After data transfer is repeated a predetermined number of times, the satellite-data-communication ground base 106 notifies the terminal 105 of results of data transfer since the terminal 105 initially requested broadcasting.

FIG. 2 is an illustrative drawing showing another type of service using an information delivery system which integrates a satellite communication system with a public telephone network.

The information delivery system of FIG. 2 is basically the same as that of FIG. 1, and the same elements as those of FIG. 1 are referred to by the same numerals. FIG. 2 is used for explaining a case in which the terminal 101 issues a request to receive data via the communication satellite 107 when the terminal 101 needs to download a large amount of data. Such a case is hereinafter referred to as a pull-type service.

In the case of the pull-type service, the terminal 101 sends a request for data transmission to the satellite-data-communication ground base 106 via the public telephone network 102. The satellite-data-communication ground base 106 obtains an IP (internet protocol) address of the terminal 101 and an IP address to which a connection needs to be established, and establishes a connection to the user center 103 which has the above IP address. The user center 103 transfers a real file to the satellite-data-communication ground base 106 as this real file is requested.

The satellite-data-communication ground base 106 obtains a satellite-network address of the terminal 101 based on the IP address of the terminal 101, and delivers the real file to the terminal 101 via the communication satellite 107. When errors are found in the received data, the terminal 101 issues a request for a repeat of data transmission to the satellite-data-communication ground base 106 via the public telephone network 102. Upon receiving the request, the satellite-data-communication ground base 106 sends the same data again to the terminal 101 via the communication satellite 107.

The push-type service of FIG. 1 has drawbacks in terms of security, reliability, and costs because a request for a repeat of data transmission is made via a public telephone network. Even when the number of receiver terminals in need of another data transfer is small and only a small amount of data transfer is needed, data transfer will be repeated by using the communication satellite 107, which incurs a large cost as fees from use of the satellite. When a satellite network is congested, further, another data transfer may need to wait at the end of a queue. Further, results of data transmission are not notified unless all the data delivery including a repeat of data transfer is completed, so that an intermediate report cannot be obtained.

The pull-type service of FIG. 2 also has drawbacks in terms of security, reliability, and costs because a request for data transmission and a request for a repeat of data transmission are made via a public telephone network. Further, the communication satellite 107 is always used for data transmission, thereby resulting in an accumulated large fee for use of the satellite.

Accordingly, there is a need for an information delivery system which delivers information to terminals via a communication satellite at a low cost while maintaining security.

SUMMARY OF THE INVENTION

Accordingly, it is a general object of the present invention to provide an information delivery system which can satisfy the need described above.

It is another and more specific object of the present invention to provide an information delivery system which delivers information to terminals via a communication satellite at a low cost while maintaining security.

In order to achieve the above objects according to the present invention, an information delivery system includes terminals receiving data via a satellite-communication system, and a user center having a destination-conversion table which lists a satellite-system receiver ID with respect to each ground-network address of the terminals, and, upon receiving a request for data delivery via an intra-network, obtaining satellite-system receiver IDs from ground-network addresses indicated as destinations of the data delivery by referring to the destination-conversion table so as to deliver requested data and a reception-control program to the destinations via the satellite-communication system. The terminals use the reception-control program to check the data-reception conditions when receiving the requested data and the reception-control program, and send a request for a repeat of the data delivery to the user center via the intra-network if the data-reception conditions are not satisfactory.

In the information delivery system described above, a public telephone network is not used, so that tight security can be maintained. Further, an intra-network which is already in place can be used in place of the public telephone network, thereby eliminating costs charged for use of the public telephone network.

According to one aspect of the present invention, an information delivery system includes a user center having a destination-conversion table which lists a satellite-system receiver ID with respect to each ground-network address of terminals and an information-definition table which specifies data to be delivered via a satellite-communication system, and, upon receiving a request for data delivery via an intra-network, obtaining one or more satellite-system receiver IDs from one or more ground-network addresses indicated as one or more destinations of the data delivery by referring to the destination-conversion table, so as to deliver requested data to the one or more destinations via the satellite-communication system only if the requested data is specified in the information-definition table.

In the information delivery system described in the above, if the requested data is not specified in the information-definition table, the requested data can be delivered via the intra-network. Since data delivery is made by using an appropriate route after selecting one of the satellite-communication system and the intra-network, costs for use of the satellite-communication system can be reduced.

Other objects and further features of the present invention will be apparent from the following detailed description when read in conjunction with the accompanying drawings.

BRIEF DESCRIPTION OF THE DRAWINGS

FIG. 5 is an illustrative drawing showing a transmission-request window;

FIGS. 6A through 6C are illustrative drawings showing tables and files used in the present invention;

FIG. 7 is also an illustrative drawing showing another information delivery system according to a principle of the present invention;

FIGS. 9A through 9E are illustrative drawings of tables and files used in the satellite-communication system of FIG. 7.

DESCRIPTION OF THE PREFERRED EMBODIMENTS

In the following, a principle of the present invention will be described with reference to the accompanying drawings.

Figure 3:
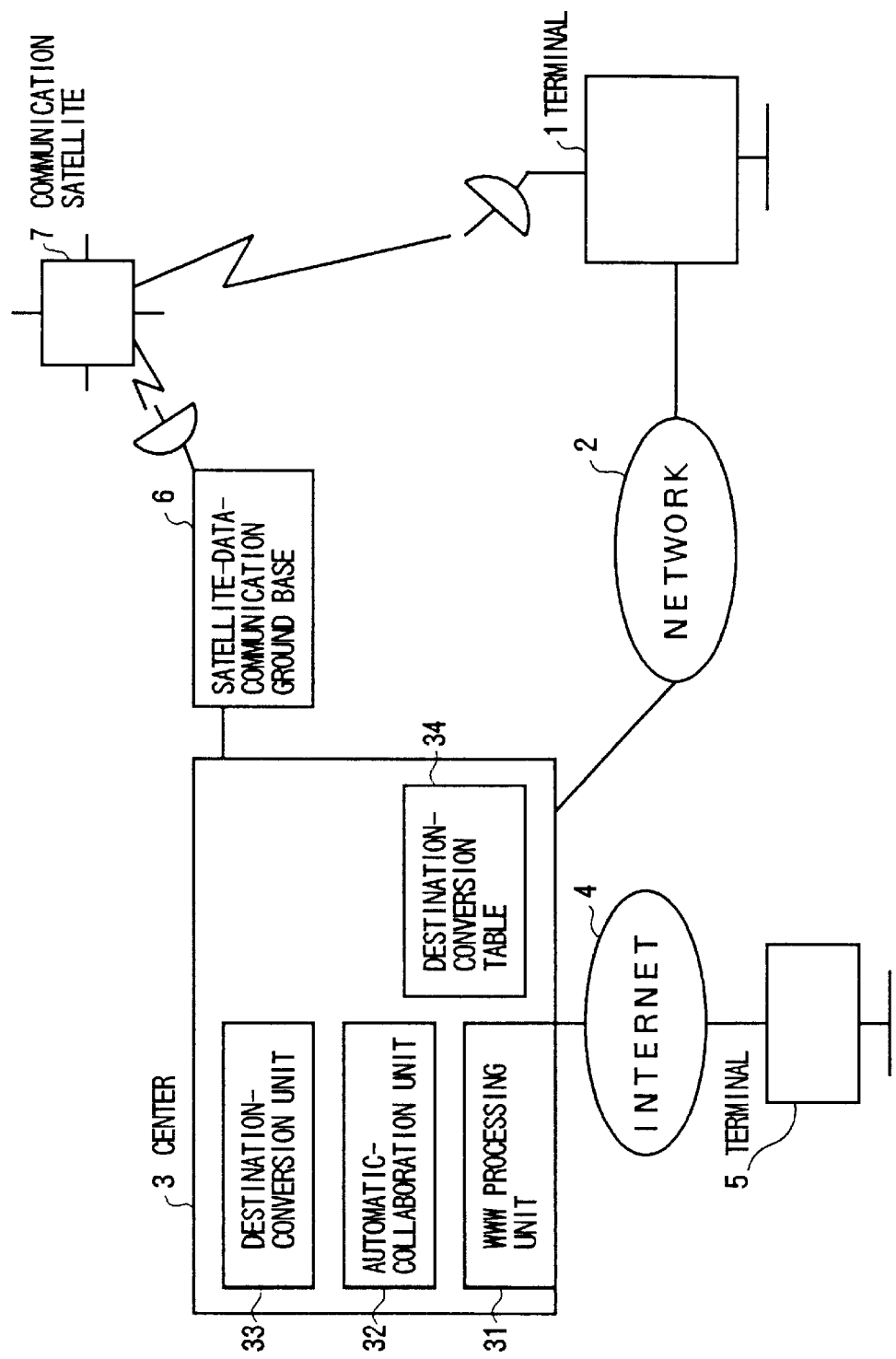
FIG. 3 is an illustrative drawing showing an information delivery system according to a principle of the present invention.

FIG. 3 is an illustrative drawing showing an information delivery system according to a principle of the present invention.

The information delivery system of FIG. 3 includes a terminal 1, a network (Intranet such as an in-house network of a corporation) 2, a user center 3, Internet 4, a terminal 5, a satellite-data-communication ground base 6, and a communication satellite 7. FIG. 3 is used for explaining the push-type service.

FIG. 7 is also an illustrative drawing showing an information delivery system according to a principle of the present invention.

The information delivery system of FIG. 7 includes the terminal 1, the network (Intranet such as an in-house network of a corporation) 2, a user center 30, the satellite-data-communication ground base 6, and the communication satellite 7. FIG. 7 is used for explaining the pull-type service. In FIG. 7, the same elements as those of FIG. 3 are referred to by the same numerals.

In FIG. 3 and FIG. 7, the terminal 1 is connected to the user center 3 or 30 via the network 2.

The user center 3 or 30 delivers data to the terminal 1 via the satellite communication system (the satellite-data-communication ground base 6 and the communication satellite 7) in response to a request for data transmission which is sent from the terminal 1 or the terminal 5 via a network.

A destination-conversion table 34 stores a registration file which lists a satellite-network address (receiver ID) and a ground-network address as a pair with respect to all the receivers (terminals).

An information-definition table 35 stores a received-data-storage directory, a file size, a delivery time, etc., with respect to each file which is to be delivered via the satellite.

A user table 36 stores a satellite-network address, a password, a delivery time, etc., for each of the users.

In what follows, operations of the information delivery system will be described.

In FIG. 3, the user center 3 receives a request for delivery from the terminal 5, and obtains a satellite-system receiver ID by finding a destination in the destination-conversion table 34. The user center 3 then delivers information to the terminal 1 via the satellite communication system (the satellite-data-communication ground base 6 and the communication satellite 7). The terminal 1 receives the information if the information is directed to the terminal 1.

When delivering the information, the user center 3 adds the satellite-system receiver ID obtained from the destination-conversion table 34 as well as a check program to the delivered information. The terminal 1 automatically executes the check program which is contained in the received data, and the check program checks the received data. If the received data has a missing part or contains erroneous data, the terminal 1 issues a request for a repeat of data transmission to the user center 3 via the network 2.

Upon receiving the request for a repeat of data transmission, the user center 3 decides whether to repeat the data transmission via the satellite-communication system or via the ground system (network 2) based on the number of terminals making a request and the cost of another data transmission. Selecting an optimum route, the user center 3 tries another data transmission.

In FIG. 7, the user center 30 receives a request for delivery via the network 2, and searches for a requested file name in the information-definition table 35. Based on a file size, a file type, etc., the user center 30 decides whether to make a delivery via the satellite-communication system or the ground system. When using the satellite-communication system, the user center 30 further refers to the destination-conversion table 34 or the user table 36 to obtain a satellite-system receiver ID (satellite-system receiver address), and delivers information to the relevant terminal 1. The terminal 1 receives delivered information if it is directed to the terminal 1.

If a requested file has a file size exceeding a predetermined amount, the data is transmitted to the terminal 1 via the satellite-communication system. If a requested file is smaller than a predetermined size, the data is transmitted to the terminal 1 via the ground system. In the case of using the satellite-communication system, the user center 30 refers to the user table 36 so as to deliver the data to the terminal 1 under specified user conditions such as a delivery time, a storage directory, etc.

Figure 1:
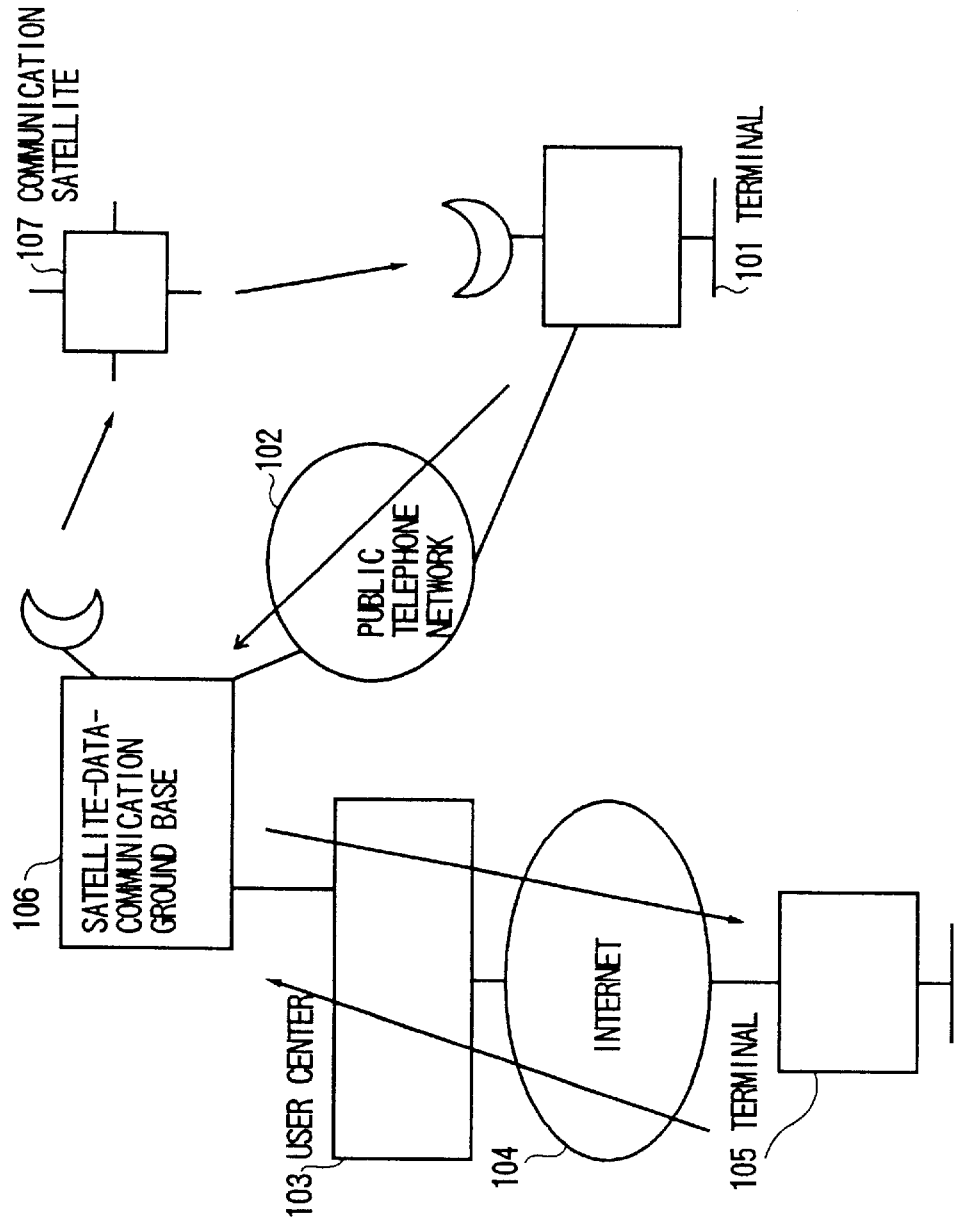
FIG. 1 is an illustrative drawing showing a related-art information delivery system which integrates a satellite communication system with Internet and a public telephone network.
Figure 2:
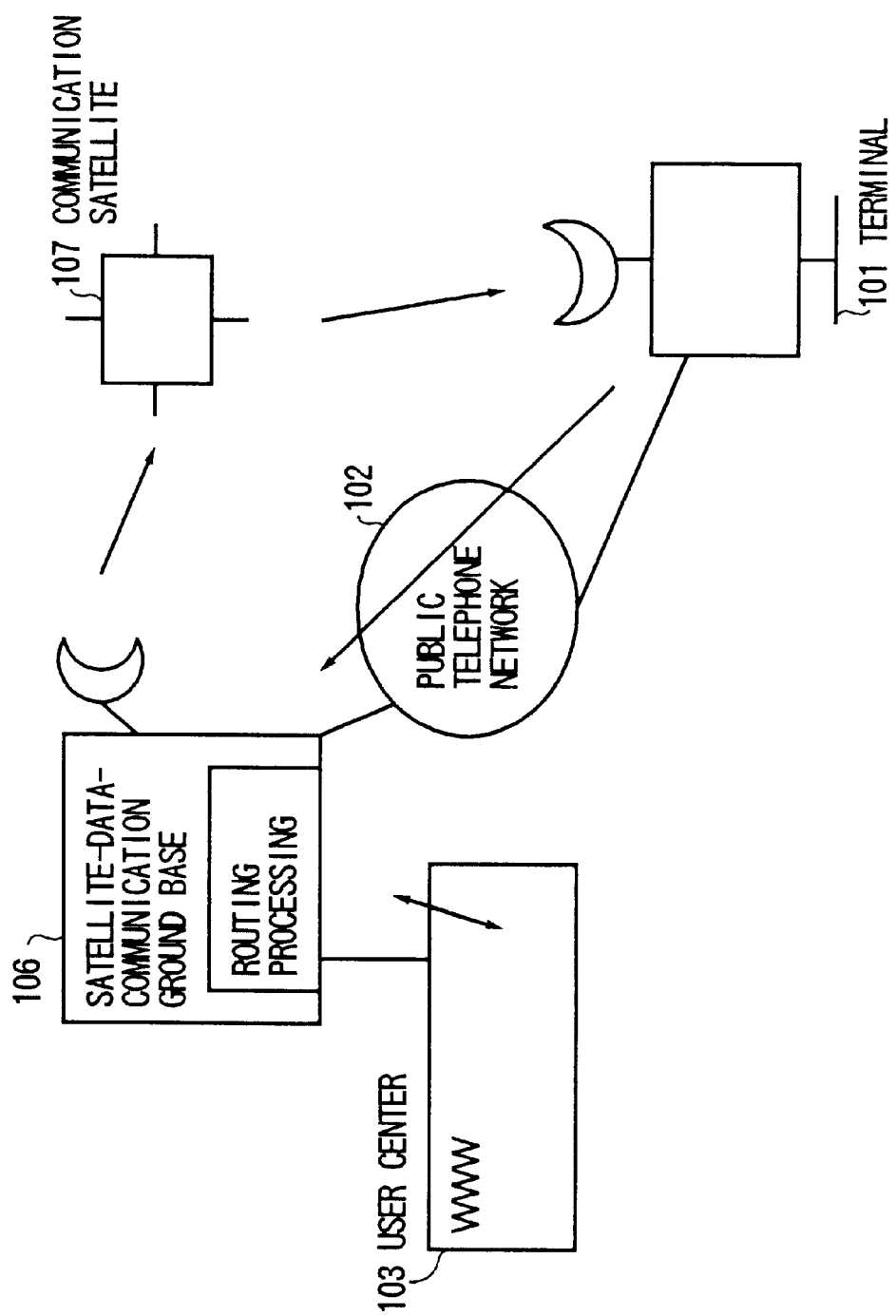
FIG. 2 is an illustrative drawing showing another type of service using a related-art information delivery system which integrates a satellite communication system with a public telephone network.

In the present invention, a public telephone network is not used as in the configurations of FIG. 1 and FIG. 2, so that tight security can be maintained. Further, an Intranet already in place can be used instead of the public telephone network, thereby eliminating costs charged for use of the public telephone network. Since data delivery is made by using an appropriate route after selecting one of the satellite-communication system and the ground system (Intranet), costs for use of the satellite-communication system can be reduced. Further, when data transmission is repeated via the ground system, there is no need to wait in queue for use of the satellite-communication system.

In the following, embodiments of the present invention will be described with reference to the accompanying drawings.

FIG. 3 through FIG. 6 will be used to give a detailed account of configurations and operations of an embodiment according to the present invention. Here, software programs for implementing functions of the present invention are provided in a memory medium, and are installed in a computer of the user center shown in FIG. 3 and FIG. 7. These programs are executed by using a memory space of the computer.

FIG. 3 is an illustrative drawing of a information delivery system according to the present invention.

In FIG. 3, the terminal 1 may be a personal computer used by a user, and establishes a connection to the user center 3 via the network 2 to request data transmission. The terminal 1 also receives data and/or programs at an antenna via the satellite-communication system comprised of the satellite-data-communication ground base 6 and the communication satellite 7. The received data may be displayed on a screen of the terminal 1, and the received programs may be used to help day-to-day business operations.

The network 2 is a network installed on the ground, and is comprised of an Intranet such as an in-house corporation network.

The user center 3 stores various information, and sends data to the terminal 1 via the satellite-communication system in response to a data-transmission request from the terminal 1 or the terminal 5. The user center 3 includes a WWW processing unit 31, an automatic-collaboration unit 32, a destination-conversion unit 33, and a destination-conversion table 34.

The WWW processing unit 31 allows the terminal 1 or 5 to display a WWW (web) window of the user center 3 on a screen of the terminal 1 or 5 via the network 2 or Internet 4, respectively. When a request for data transmission is made on the WWW window at a site of the terminal 1 or the terminal 5, the WWW processing unit 31 learns a name of a requested file at a site of the user center 3. The WWW processing unit 31 also attends to various processes concerning the WWW system. The user center 3 and the terminal 5 are based on the WWW system. When the terminal 5 needs to send to the user center 3 information which is to be transmitted via the communication satellite 7, the terminal 5 serving as a client of the WWW system uses HTTP (hyper text transfer protocol), which is a communication protocol of the WWW system. In response, the user center 3 serving as a server of the WWW system receives the information by using the WWW processing unit 31.

The automatic-collaboration unit 32 collaborates with the WWW processing unit 31 to give an instruction to the destination-conversion unit 33 in preparation for sending the data requested by the terminal 5 to the requested satellite-system receiver ID.

The destination-conversion unit 33 converts a destination provided with regard to the ground system such as the network 2 into a satellite-system receiver ID by making reference to the destination-conversion table 34.

The destination-conversion table 34 stores a satellite-system receiver ID with respect to each destination.

The Internet 4 is a world-wide network which conducts data communication by exchanging packets using the TCP/IP protocol.

The terminal 5 is connected to the Internet 4, and is used by a user who requests data transmission. The terminal 5 specifies information to be transmitted for the user center 3.

The satellite-data-communication ground base 6 sends data supplied from the user center 3, which requests transmission of the data, to the communication satellite 7. The data is comprised of the receiver ID of the terminal 1, a reception-control program, and data including data and programs.

The communication satellite 7 transfers data supplied from the satellite-data-communication ground base 6 to the terminal 1.

In what follows, an operation of the configuration of FIG. 3 will be described below with reference to FIG. 4.

Figure 4:
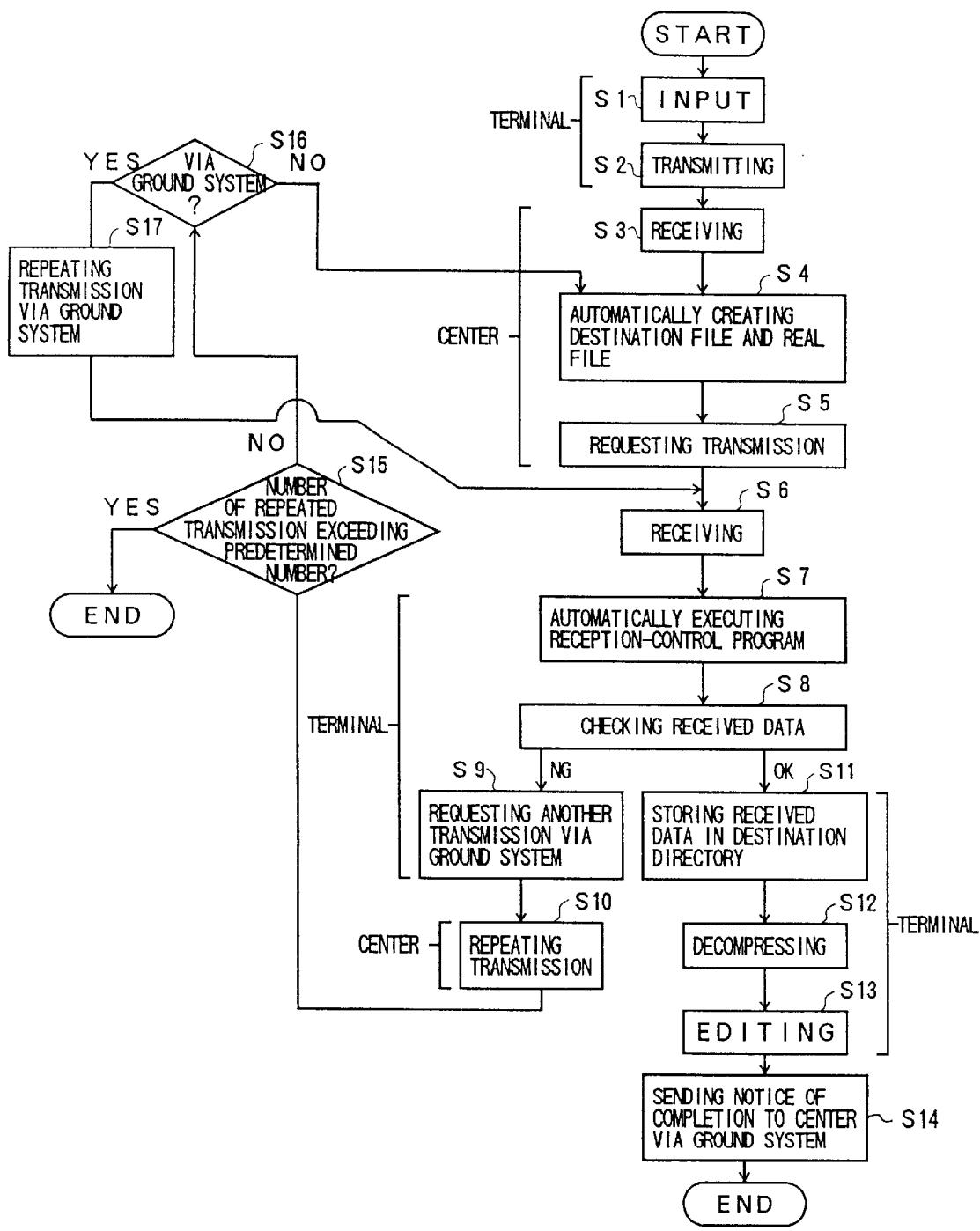
FIG. 4 is a flowchart of an operation of the satellite-communication system of FIG. 3.

FIG. 4 is a flowchart of an operation of the satellite-communication system of FIG. 3.

At a step S1, data is input to the terminal 5. Namely, a user who wishes to deliver information enters various information as shown on the right-hand side of FIG. 4 in the terminal 5. This data entry is made by operating on a window such as shown in FIG. 5 provided on a screen of the terminal 5. Information to be entered is as follows.

| File for Transmission | file name of delivered information |
|---|---|
| Destination Directory Name | name of directory storing files in terminal 1 |
| Destination List (e.g., Branch Names) | name of group including terminal 1 |
| Reception-Control Program Name (Check Program Name) | name of program for checking file transmission |

At a step S2, the entered data is transmitted to the user center 3. Namely, the data entered at the step S1 by using the transmission request window of FIG. 5, for example, is sent to the user center 3 via the network 2.

At a step S3, the user center 3 receives the data transmitted at the step S2.

At a step S4, a destination file and a real file are automatically created. This is done by the user center 3 based on the information received at the step S3. An automatically created destination file is shown in FIG. 6A, an is created in accordance with a request format for satellite-data communication. An automatically created real file is shown in FIG. 6C. These files will be described later in detail.

At a step S5, the user center 3 issues a transmission request to the satellite-data-communication ground base 6. Namely, the user center 3 transfers the destination file and the real file automatically created at the step S4 to the satellite-data-communication ground base 6. Upon this file transfer, the satellite-data-communication ground base 6 delivers the delivery data via the communication satellite 7.

At a step S6, the terminal 1 receives the delivery data. Namely, when the user center 3 issues the transmission request to the satellite-data-communication ground base 6 at the step S5, the satellite-data-communication ground base 6 transmits the data to the communication satellite 7, and the communication satellite 7 passes the data to the terminal 1, which in turn receives the data. The terminal 1 receives data only if a destination file included in the data lists the satellite-system receiver ID of the terminal 1.

At a step S7, upon receiving the destination file from the communication satellite 7, the terminal 1 automatically executes the reception-control program included in the destination file.

At a step S8, a check is made on the received data. Namely, a check program of the reception-control program, which is automatically activated at the step S7, checks whether the received data has a missing part or data errors (this check is made based on a total number of bytes, ECC, etc., included in control information).

At a step S9, since the check at the step S8 finds abnormality, the terminal 1 sends a request for a repeat of data transmission to the user center 3 via the ground system (i.e., via the network 2). When making this request, the terminal 1 gives a network address thereof as a destination.

At a step S10, the user center 3 starts a process of repeating data transmission with respect to the terminal 1 corresponding to the indicated destination. The process of repeating data transmission will be later described in detail.

At a step S11, since the check at the step S9 finds that all the data is received without an error, the terminal 1 stores the received data in the destination directory. Namely, data of the real file is stored in the destination directory specified in the destination file of FIG. 6B, which is included in the received data.

At a step S12, the received data is decompressed. Since the received data stored in the destination directory at the step S11 is compressed data, the received data needs to be decompressed to obtain original data.

At a step S13, the data is edited. Namely, data obtained after decompression at the step S12 is edited to obtain information of a correct format (i.e., the data is edited so as to arrange text and images in an order of catalog-specified page numbers).

At a step S14, a notice of completion is sent to the user center 3 via the ground system (i.e., via the network 2).

When the user center 3 starts the process of repeating data transmission, the following operations will be performed.

At a step S15, a check is made whether the number of repeated data transmissions exceeds a predetermined data-transmission number. If it does, the procedure ends. Otherwise, the procedure goes to a step S16.

At the step S16, a check is made whether the data transmission should be repeated via the ground system. The decision is made by factoring in the number of terminals needing another data transmission and the size of transmitted data. If the number of terminals in need of another data transmission is small and the data has a small size, use of the satellite-communication system incurs exorbitant costs. If the data transmission is repeated via the network 2, costs can be reduced. When the number of terminals in need of another data transmission is small and the data has a small size, use of the network 2 does not interfere with data transfers relating other business operations. A decision as to whether to use the ground system, thus, can be made based on a comparison of the number of requesting terminals with a predetermined number and a comparison of a transmission data size with a predetermined data size. When using the satellite-communication system, the procedure goes back to the step S4 to repeat the following steps. In the case of use of the ground system, the procedure goes to the step S17.

At the step S17, the data transmission is repeated via the ground system. Namely, using the network 2, the user center 3 sends the data again to a destination having the network address received at the step S9.

In this manner, if the terminal 5 issues a transmission request via the Internet 4 with an aim of transmitting color-catalog data to a specified geographical area, for example, the user center 3 automatically creates a destination file of FIG. 6B and a real file of FIG. 6C (with compressed data), and sends these files to the terminal 1 via the satellite-communication system. In response, the terminal 1 receives the data, and decompresses and edits the data to obtain an original color catalog before showing it on a screen or printing it on sheets of paper. In this manner, data such as an image the size of several mega bytes (e.g., JPEG image) like a color catalog and a moving picture with audio data (e.g, MPEG data or AVI), which cannot be downloaded via the ground network 2, can be readily sent to the terminal 1 via the satellite-communication system at a high speed and at a low cost, and the terminal 1 can display or print the received data. Further, not only text/image data such as catalog data but also programs can be automatically delivered to a destination directory.

Since a large amount of data can be transmitted, the reception-control program (check program) can be sent along with the real data. Upon receiving the data, therefore, the terminal 1 can check whether the received data is acceptable, and can automatically send a request for a repeat of data transmission to the user center 3 via the network 2.

FIG. 5 is an illustrative drawing showing a transmission-request window. FIG. 5 shows an example of a window which is used when data entry is made to the terminal 1 at the step S1 of FIG. 4.

FIGS. 6A through 6C are illustrative drawings showing tables and files used in the present invention.

FIG. 6A shows an example of the destination-conversion table 34. The destination-conversion table 34 lists a satellite-system receiver ID with respect to each destination (which is represented by a ground network address). As shown in the example of FIG. 6A, the destination may be indicated by using a name such as a branch name corresponding to a network address. Since correspondences between destinations and satellite-system receiver IDs are listed in the destination-conversion table 34, the user center 3 of FIG. 3 can obtain the satellite-system receiver ID of a destination by searching the destination-conversion table 34 for the destination (network address) of the relevant terminal 1 when the user center 3 receives the destination from the terminal 5 via the Internet 4. After this, the user center 3 sets the satellite-system receiver ID in the destination file of FIG. 6B among other items which are also filled in, and combines the destination file with the real file to send the combined data to the terminal 1 via the satellite-communication system.

FIG. 6B shows an example of the destination file. The destination file is necessary when data is transmitted to the terminal 1 via the satellite-communication system. In what follows, the items provided below will be described.

| | |
|---|---|
| Name of Transmitted File | name of requested file |
| Destination Directory | name of directory storing data in the destination |
| Satellite-System Receiver ID | receiver ID of each terminal on the satellite system |
| Reception-Control Program Name (Check Program Name) | name of control program for checking errors, etc. |
| Other Items | |

The name of a transmitted file and the destination directory are given by the user at the time of making a transmission request. The satellite-system receiver ID is created by referring to the destination-conversion table 34. The reception-control program name specifies a program which is automatically executed when the terminal 1 receives the destination file and the real file from the satellite-communication system, and includes a name of a check program or the like. The reception-control program name is input by the user when a transmission request is made. In the event that no name is provided, the name of the check program is used as a default.

Other items in the above include a delivery starting time, a delivery ending time, a result-report E-mail address, an all-destination-result-report flag, a delivery-result flag, priority (high, intermediate, low), and a repeat-process flag. All of these can be specified by the user at the time of making a transmission request.

FIG. 6C shows an example of the real file. The real file contains data which is received by the terminal 1 via the satellite-communication system, and includes the reception-control program (check program) and data. The data is transmitted in a compressed form, so that the received data needs to be decompressed before serving any use. The check program of the reception-control program, upon activation, checks whether all the data is received without any error (e.g., whether the number and data size of received files are correct) based on control information included in the received data.

As described in the above, the present invention makes it possible to distribute a large amount of data registered in the user center via the satellite-communication system by utilizing a network such as Intranet. Further, a program for checking data delivery is transmitted along with the data, so that a request for a repeat of data transmission can be automatically made to the user center via the existing network.

Figure 8:
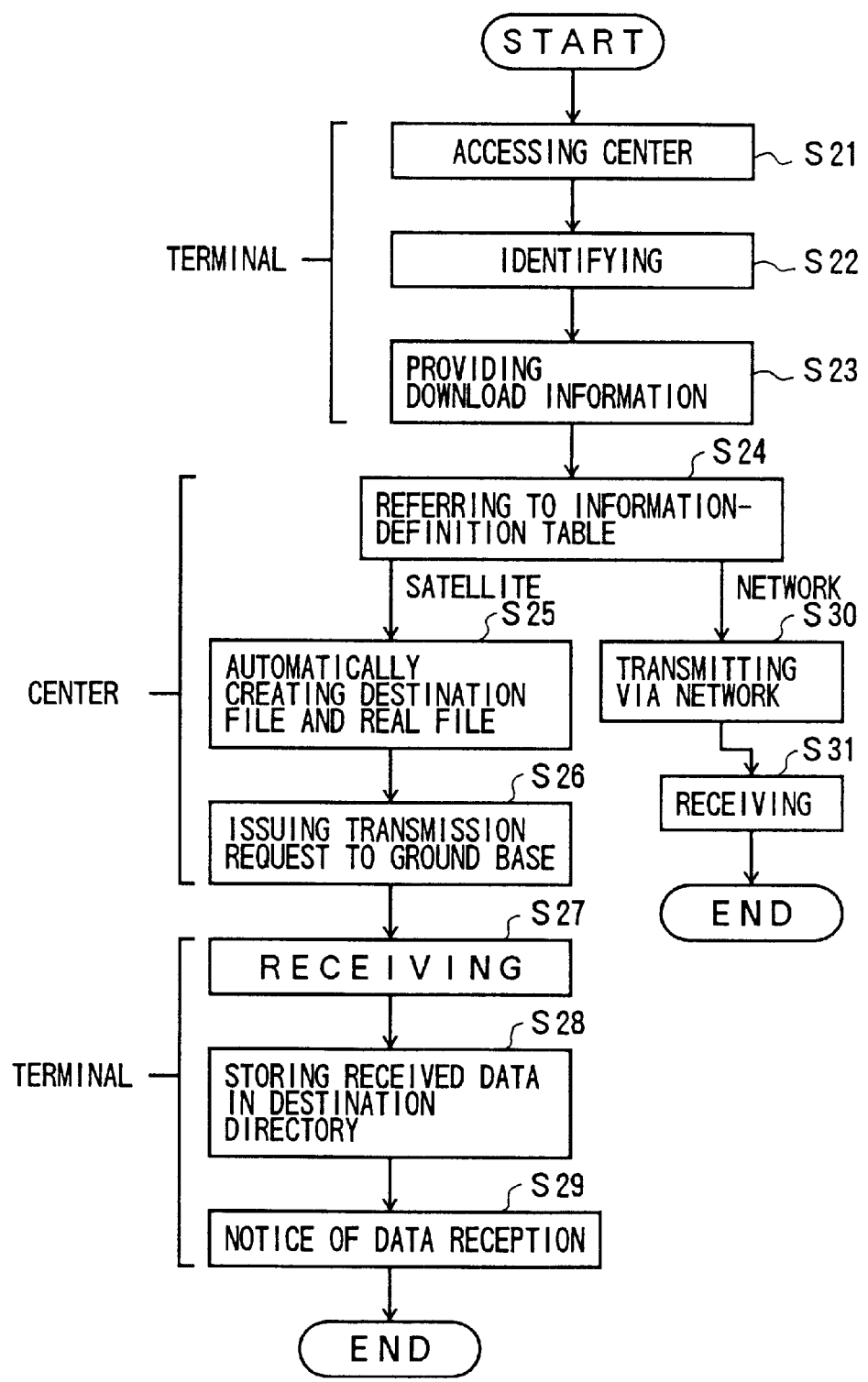
FIG. 8 is a flowchart of an operation of the satellite-communication system of FIG. 7.

In what follows, FIG. 7 through FIG. 9 will be used for describing another embodiment and operations thereof according to the present invention.

FIG. 7 is an illustrative drawing of an information delivery system according to another embodiment of the present invention. The satellite-communication system of FIG. 7 is used for explaining the pull-type service. In FIG. 7, the terminal 1, the network 2, the satellite-data-communication ground base 6, and the communication satellite 7 are the same as those of FIG. 3, and a description there of will be omitted.

In FIG. 7, the user center 30 is connected to the terminal 1 via the network 2, and makes the terminal 1 display a window on a screen of the terminal 1. When a file is specified on the displayed window, the user center 30 downloads the file to the terminal 1. The user center 30 includes the WWW processing unit 31, the automatic-collaboration unit 32, the destination-conversion unit 33, the destination-conversion table 34, the information-definition table 35, and the user table 36.

The WWW processing unit 31 attends to various WWW processes such as identifying a file when the transmission of the file is requested on a window displayed on a screen of the terminal 1, to which the WWW processing unit 31 is connected via the network 2. Operations of a server and a client have been described in connection with FIG. 3, and a description thereof will be omitted.

The automatic-collaboration unit 32 collaborates with the WWW processing unit 31 to give an instruction to the destination-conversion unit 33 in preparation for sending data to the terminal 1 via the satellite-communication system.

The destination-conversion unit 33 converts a destination provided with regard to the ground system such as the network 2 into a satellite-system receiver ID by making reference to the destination-conversion table 34.

The destination-conversion table 34 stores a satellite-system receiver ID with respect to each destination which is represented by a ground-system address of the network 2.

The information-definition table 35 stores a received-data-storage directory, a file size, a delivery time, etc., with respect to each file which is to be delivered via the satellite.

A user table 36 stores a satellite-network address, a password, a delivery time, etc., for each of the users.

In the following, operations of the configuration of FIG. 7 will be described with reference to the flowchart of FIG. 8.

FIG. 8 is a flowchart of an operation of the satellite-communication system of FIG. 7.

At a step S21, the terminal 1 accesses the user center 30 via the network 2.

At a step S22, a connection is established between the terminal 1 and the user center 30 when the terminal 1 is identified by the user center 30. This identification process is carried out, for example, by a procedure in which the user center 30 checks if an input password matches a registered password, and identifies the terminal 1 when the check gives an affirmative result.

At a step S23, the terminal 1 provides the user center 30 with information on downloaded data. This information includes a file name of the data to be delivered.

At a step S24, the user center 30 refers to the information-definition table 35. Namely, the information-definition table 35 shown in FIG. 9A, as will be described later, is referred to, and a check is made whether the file indicated at the step S23 is to be downloaded via the satellite-communication system. This decision is made based on a file type, a file size, etc., and a detailed description thereof will be provided later. In principle, files which are not registered in the information-definition table 35 are downloaded via the ground system rather than via the satellite-communication system. If the ground system is to be used, the procedure goes to a step S30.

At the step S30, the user center 30 serving as a server of the conventional WWW system searches for a file indicated by the terminal 1 serving as a client, and sends the searched file to the terminal 1 via the network 2 by using the HTTP protocol.

At a step S31, the terminal 1 receives the data, and may display the contents of the data, for example.

At a step S25, since it is decided to use the satellite-communication system after checking the information-definition table 35, a destination file and a real file are automatically created as delivery data. The destination file and the real file are shown in FIG. 9C and FIG. 9D, respectively, which will be described later.

At a step S26, the user center 30 issues a transmission request to the satellite-data-communication ground base 6. Namely, the user center 30 transfers the destination file and the real file automatically created at the step S25 to the satellite-data-communication ground base 6. Upon this file transfer, the satellite-data-communication ground base 6 delivers the delivery data via the communication satellite 7.

At a step S27, the terminal 1 receives the delivery data. Namely, when the user center 30 issues the transmission request to the satellite-data-communication ground base 6 at the step S26, the satellite-data-communication ground base 6 transmits the data to the communication satellite 7, and the communication satellite 7 passes the data to the terminal 1, which in turn receives the data. The terminal 1 receives data only if a destination file included in the data lists the satellite-system receiver ID of the terminal 1.

At a step S28, the terminal 1 stores the received data in the destination directory. Namely, the data received at the step S27 is stored in the destination directory specified in the received destination file.

At a step S29, a notice of data reception is displayed on a screen of the terminal 1.

In this manner, when the terminal 1 sends a download request to the user center 30 via the network 2, the user center 30 refers to the information-definition table 35 of FIG. 9A to check whether to download a file via the satellite-communication system. If it is decided to use the satellite-communication system, the user center 30 automatically creates the destination file and the real file, and sends data to the terminal 1 via the satellite-communication system. Upon receiving the data, the terminal 1 stores the received data in an indicated directory. This makes it possible to readily download a large amount of data and/or programs to the terminal 1 at a high speed and at a low cost whereas downloading of such a large amount of data and or programs is almost impossible via the ground network 2.

FIGS. 9A through 9E are illustrative drawings of tables and files used in the satellite-communication system of FIG. 7.

FIG. 9A shows an example of the information-definition table 35. The information-definition table 35 lists satellite-delivery files which are to be delivered via the satellite-communication system among other files maintained in the user center 30. The information-definition table 35 also lists a received-file-storage directory of the terminal 1, a file size, a delivery time, etc with respect to each of the satellite-delivery files. Further, an auxiliary table is provided to list a threshold-for-satellite-transmission size, a file-for-satellite-transmission type, and a received-file-storage directory.

The user center 30 refers to the auxiliary table when the terminal 1 serving as a client gives a name of a downloaded file. If the downloaded file satisfies the conditions specified in the auxiliary table, this file is delivered via the satellite-communication system. In the example of FIG. 9A, if a file size exceeds 1 MB or a file type is either one of "mpg" or "ppt", then, the file is transferred via the satellite-communication system. That is, a file having a large size is delivered via the satellite-communication system. The file type "mpg" indicates that a file is that of an MPEG moving picture. If a file has this file type, the amount of data transmission is going to be very large. It is decided, therefore, that the use of the satellite-communication system is appropriate.

Files which do not satisfy the conditions of the auxiliary table are also delivered via the satellite-communication system as long as these files are registered in the information-definition table 35. The received-file-storage directory is a name of a directory which stores a downloaded file in the terminal 1. For example, the received-file-storage directory may be C:\sate as shown in the figure. Since the user center 30 has a list of received-file-storage directories in the information-definition table 35, programs/data corresponding to an indicated file name can be stored in an indicated directory of the terminal 1 when the programs/data are downloaded to the terminal 1 via the satellite-communication system.

The information-definition table 35 of FIG. 9A may list a flag for each entry to indicate whether to download a file via the satellite-communication system or via the ground network. When the flag is set to "on", the file is sent via the satellite-communication system. Otherwise, the ground network is used instead. The field of delivery time in the information-definition table 35 lists a delivery time, which is referred to so that a file requested for downloading is delivered only during the indicated-delivery timeframe. Alternately, the file may be downloaded to the terminal 1 via the satellite-communication system when time matches a registered timeframe, and may be downloaded via the ground network during other timeframes.

FIG. 9B shows an example of the destination-conversion table 34. The destination-conversion table 34 lists a satellite-system receiver ID with respect to each destination (an address of the ground network). Since the satellite-system receiver IDs are recorded in the destination-conversion table 34 with respect to each destination, the user center 30 of FIG. 7 can obtain the satellite-system receiver ID of a destination by searching the destination-conversion table 34 for the destination (network address) of the relevant terminal 1 when the user center 30 receives the destination from the terminal 5 via the Internet 4. After this, the user center 30 sets the satellite-system receiver ID in the destination file of FIG. 9C among other items which are also filled in, and combines the destination file with the real file to send the combined data to the terminal 1 via the satellite-communication system.

FIG. 9C shows an example of the destination file. The destination file is necessary when data is transmitted to the terminal 1 via the satellite-communication system. In what follows, the items provided below will be described.

| | |
|---|---|
| Name of Transmitted File | name of requested file |
| Destination Directory | name of directory storing data in the destination |
| Satellite-System Receiver ID | receiver ID of each terminal on the satellite system |
| Reception-Control Program Name (Check Program Name) | name of control program for checking errors, etc. |
| Other Items | | destination directory are given by the user at the time of making a transmission request. The satellite-system receiver ID is created by referring to the destination-conversion table 34. The reception-control program name specifies a program which is automatically executed when the terminal 1 receives the destination file and the real file from the satellite-communication system, and includes a name of a check program or the like. The reception-control program name is input by the user when a transmission request is made. In the event that no name is provided, the name of the check program is used as a default.

Since the reception-control program names are specified in the same manner as in the case of the push-type service, the pull-type service can also check errors or the like of the received data by using the automatically activated program, thereby making it possible to automatically make a request for a repeat of data transmission.

Other items in the above include a delivery starting time, a delivery ending time, a result-report E-mail address, an all-destination-result-report flag, a delivery-result flag, priority (high, intermediate, low), and a repeat-process flag. All of these can be specified by the user at the time of making a transmission request.

FIG. 9D shows an example of the real file. The real file contains data which is received by the terminal 1 via the satellite-communication system, and includes the data to be transmitted (the contents of a downloaded file). Here, the real file may also include a reception-control program (check program) as shown in FIG. 6C. Delivery of the data including the reception-control program makes it possible to check whether all the data is received without any error (e.g., whether the number and data size of received files are correct).

FIG. 9E shows an example of the user table 36. The user table 36 includes a user name, a password, a satellite-system address (receiver ID), an IP address (ground-network address), a file-storage directory, a destination for sending a notice, and a delivery time with respect to each user. Use of the user table 36 makes it possible to identify a user and obtain a receiver ID as well as to set various conditions for each user. When the terminal 1 accesses the user center 30, a check is made as to whether a given password matches a registered password kept in the user table 36, so as to identify the user. At the same time, the satellite-system addresses registered in the user table 36 can be referred to in order to obtain a satellite-system receiver ID. In an example of FIG. 9E, the field of IP addresses does not have any entry. If identification of a user is not necessary, a network address may be registered in the field so that the network address and a corresponding satellite-system address can be automatically matched. In this case, the user table 36 ends up containing the destination-conversion table of FIG. 9B in effect.

The file-storage directory and the delivery time of the user table 36 have higher priority than the file-storage directory and the delivery time of the information-definition table 35 shown in FIG. 9A. Namely, registration of the file-storage directory and the delivery time in the user table 36 achieves user-wise condition settings. If the file-storage directory and the delivery time are not registered in the user table 36, the file-storage directory and the delivery time in the information-definition table 35 are used instead.

As described in the above, the present invention maintains a record of correspondences between ground-network terminal IDs and satellite-system terminal IDs in the user center, and can download data via the satellite-communication system when the data has a large size.

In the related art, a provider receives a request for satellite communication, and delivers data by using satellite data communication after retrieving the data from a server. On the other hand, the present invention allows the user center serving as a server to give a direct instruction requesting a satellite-data communication when the user center receives a request for data delivery from a terminal serving as a client. The satellite system is used only for downloading of data in the present invention, and no access is made to the server from outside sources. This configuration can maintain a high security level, and, also, makes it possible to deliver data which is only accessible for the purpose of data delivery whereas delivery of such data would not be possible in the related art because of necessary limitations of access to the server.

As described in the above, the present invention employs a configuration in which data is delivered to the terminal 1 via the satellite-communication system in response to a transmission request when such a request is issued via the network 2, which is an Intranet such as an in-house corporate network. Since no public telephone network is used as an intervening network, security can be maintained in contrast with the related-art configuration. Instead of the public telephone network, an existing Intranet is used in the present invention, so that costs for use of the public telephone network can be eliminated. Further, the data is delivered or redelivered by selecting an appropriate one of the satellite-communication system and the ground system (Intranet), thereby reducing the cost for use of the satellite-communication system. Another advantage is that when the data transmission is repeated via the ground system, there is no need to wait in queue before the satellite-communication system becomes available.

Accordingly, the present invention can readily deliver data to the terminal 1 at a high speed and at a low cost.

Further, the present invention is not limited to these embodiments, but various variations and modifications may be made without departing from the scope of the present invention.

What is claimed is:

1. An information delivery system comprising:

a user center having a destination-conversion table which lists a satellite-system receiver ID with respect to each ground-network address of terminals and an information-definition table which specifies one or more file types of data to be delivered via a satellite-communication system, and, upon receiving a request for data delivery via a network, obtaining one or more satellite-system receiver IDs from one or more ground-network addresses indicated as one or more destinations of said data delivery by referring to said destination-conversion table, so as to deliver requested data to said one or more destinations via said satellite-communication system if a file type of said requested data matches said one or more file types in said information-definition table and to deliver the requested data to said one or more destinations via the network otherwise.

2. The information delivery system as claimed in claim 1, wherein said information-definition table specifies data to be delivered via said satellite-communication system if a data size of said data exceeds a predetermined amount.

3. The information delivery system as claimed in claim 1, wherein said information-definition table further specifies a delivery time, so that said requested data is delivered only during a timeframe indicated by said delivery time.

4. A machine-readable computer medium having a program embodied therein for causing a user center to deliver data to terminals via a satellite-communication system, said program comprising:

destination-conversion program-code means for converting a network address of a given terminal into a satellite-system receiver ID; and delivery program-code means for, upon receiving a request for data delivery via a network, checking if a file type of requested data matches a predetermined file type, and for obtaining one more satellite-system receiver IDs from one or more ground-network addresses indicated as one or more destinations of said data delivery by using said destination-conversion program-code means so as to deliver requested data to said one or more destinations via said satellite-communication system if said checking finds that the file type of said requested data matches the predetermined file type and to deliver the requested data to said one or more destinations via the network otherwise.

* * * * *